Jan. 17, 1939.   A. SCHLECKER   2,144,345
METER FOR FLUIDS
Filed April 22, 1937
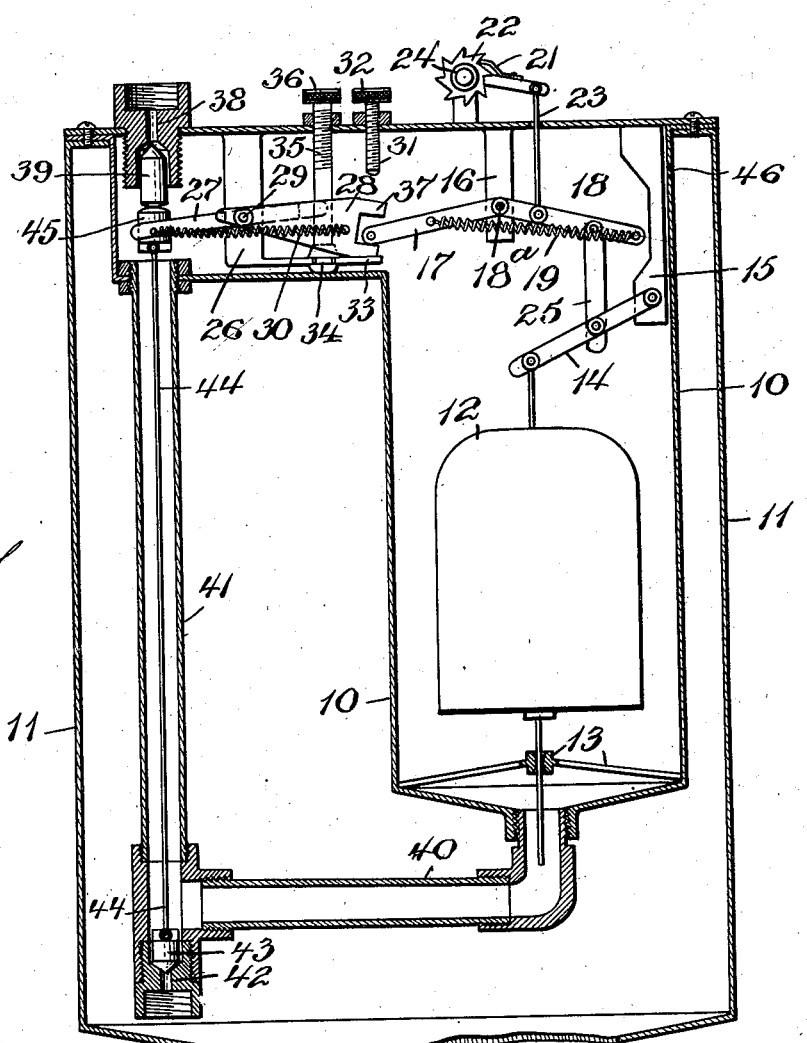
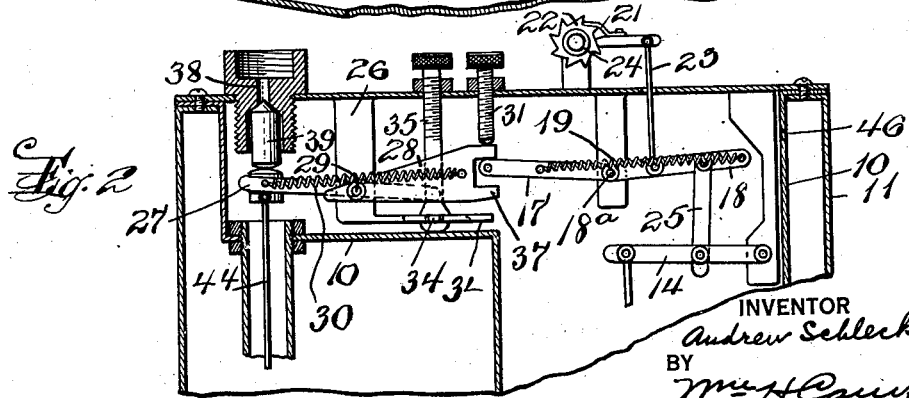
INVENTOR
Andrew Schlecker
BY
M. H. Caufield,
ATTORNEY.

Patented Jan. 17, 1939

2,144,345

UNITED STATES PATENT OFFICE 2,144,345

METER FOR FLUIDS

Andrew Schlecker, Nutley, N. J.

Application April 22, 1937, Serial No. 138,359

2 Claims. (Cl. 73—225)

This invention relates to an improved mechanism for positively actuating such devices as meters and similar measuring devices in which any dragging or slow movement is to be avoided and to prevent inoperativeness by stalling in a neutral position.

The invention also resides in such mechanism adapted for use in a meter for fluids, which is the principal use of such mechanism. For instance, in meters such as used for measuring fuel, lubricators and the like for motor trucks, pleasure cars, stationary engines and similar machines it is essential for accuracy that the admission and/or escape of fluid be positive and prompt. The present device is designed to provide such prompt opening and closing of the required valves whether operating under gravity or pressure.

The device is illustrated as part of a float-operated meter which meter also actuates inlet and outlet valves through the medium of apparatus which is inoperative when the float is in a neutral position, this in order to prevent both valves being open at the same time. If this balancing occurs much fluid passes through without being measured or registered and the present device overcomes this defect by a connection that is inoperative when the float is in such neutral position and thus insures the further movement of the float before positive operation of the valves.

The invention is illustrated in the accompanying drawing in which Figure 1 is a sectional view showing my invention applied to a meter for measuring liquids, the valves being arranged for inlet of fluid. Figure 2 is a detail section showing the mechanism in position for closing the inlet valve.

In said views the tank 10 is the measuring tank and is usually provided with an outer reserve tank or reservoir 11, the latter tank being usual but not essential except to provide a steady flow to the point of use. The float 12 is guided by the bearing 13 and the lever 14 to which it is pivoted, and which is pivoted in turn to the bracket 15. At the top of the tank is a snap toggle of the type that is quickly carried over center to one side or the other by a spring. The toggle is supported on a post 16 and comprises, in this instance, two levers 17 and 18 both pivoted at one end and preferably to a pivot 18ᵃ common to both. The spring 19 is secured to the levers and acts to yieldingly hold them to each side of the common pivot 18ᵃ and also to snap the toggle over the pivot 18ᵃ when it passes the center or pivot. This toggle is shown connected to a register or counter and I illustrate the pawl 21 operatively contacting a ratchet 22 on a shaft 24 of a suitable counter, the pawl being supported on a lever connected to a rod 23 secured to the lever 18. The lever 18 is connected to lever 14 by link 25.

A second snap toggle or its equivalent is operated from the first toggle. The second toggle operates the valves or other mechanism to be influenced from the float. Between the two toggles and part thereof is a lost-motion device that is designed to insure the positive operation of the mechanism by preventing a sustained neutral position of the float.

The second toggle is supported by a post 26 and comprises the oppositely extending levers 27 and 28, both hinged to the pivot 29. A spring 30 is secured under tension to the two levers or arms 27 and 28. The second toggle is limited in its upward movement by an adjustable stop 31 which is shown as screw stud having a finger piece 32 for its adjustment and screwed through the top of the tank. The second toggle is limited in its downward movement by a stop 33 which is shown as a resilient extension of the post 26 and fitting in a slotted part 34 of a screw 35 screwed in the top of the tank and provided with a finger-piece 36. The stops are shown as in the path of the movement of the lever 28 and can limit the movement of the second toggle to prevent overthrow. The stops regulate the throw of the second toggle and due to the connections this controls the distance travelled by the float. This allows a final adjustment for accuracy which of course is determined primarily by the size of the float relative to the capacity of the tank.

The first operates the second toggle and any desirable lost-motion connection is used to prevent the second toggle from being thrown over while the float 12 is in neutral position. The form shown embodies a forked end 37 on the lever 28 which end receives the end of the lever or arm 17 with a free limited vertical play to enable the first toggle considerable movement before it engages the lever 28 and continued movement until the second toggle is snapped over.

In the illustrated embodiment of the invention comprising a fluid control measuring device the tank is provided with an inlet port 38 adapted for attachment to a supply pipe and having a valve 39 for closing the port. At the bottom of the tank 10 I secure a pipe 40 which communicates with a vertical pipe 41, the pipe 41 having an outlet port 42 at the bottom and provided with a valve 43 for closing the outlet port. The outlet port fitting may be secured to a discharge pipe but I prefer to have it discharge into the reserve tank 11 which in turn is provided with an outlet (not shown).

The valves are operated from the lever 27, the valve 43 being connected to the lever 27 by a rod 44 and block 45 and the valve 39 resting on the block 45. The valve 39 may be secured to the rod 44 or secured to the block 45. In this way when one valve is snapped open the other one is snapped shut. The arrangement of the tank 10 inside the reserve tank 11 is one that provides for an easily controlled compact measuring device but at the same time allows considerable storage capacity. Any check on easy flow is prevented by vent 46 to the outer or reservoir tank.

The operation of the device is as follows:

As shown in Figure 1, the inlet valve 39 is open and outlet valve 43 is closed. As liquid flows in it raises the float 12 and moves the levers 17 and 18 upwardly toward alignment but the loose fork 37 is not operated until the first toggle is ready to throw over and then the toggle continues to rise and also the second toggle which then snaps up and snaps closed the valve 39 and opens the valve 43. The parts are now in the position shown in Figure 2. On the withdrawal of fluid the reverse action takes place as the float moves the first toggle which engages the second toggle and then throws the second toggle over to again open the inlet valve and close the outlet valve.

By this mechanism there can be no neutral position where the partly open valves would allow a constant flow into and from the tank if such flow is equal to hold the float 12 stationary.

Excess movement of the parts is prevented by the stops 31 and 33 which limit the throw of the second toggle.

Various changes can be made in the form and proportion of parts without departing from the scope of my invention.

I claim:

1. A meter for fluids comprising a tank, a pipe connected to the bottom and the upper part of the tank and having a vertical part, the tank having an inlet opening at the top in line with said part, the pipe having an outlet opening at the bottom of the vertical part, a stem in the vertical pipe, a valve in the inlet opening, a valve in the outlet opening, a connection between both valves and the stem whereby they are operated in unison, a float in the tank, a snap toggle connected to the float, said snap toggle including oppositely extended levers, a second snap toggle comprising two oppositely extending levers, one of said last named levers having a forked end to loosely receive the end of one of the levers, of the first toggle, the other of said levers of the second toggle being secured to the stem, a counter and a connection between the counter and one of the toggles.

2. A meter for fluids comprising a tank, a pipe connected to the bottom and the upper part of the tank and having a vertical part, the tank having an inlet opening at the top in line with said part, the pipe having an outlet opening at the bottom of the vertical part, a stem in the vertical pipe, a valve in the inlet opening, a valve in the outlet opening, a connection between both valves and the stem whereby they are operated in unison, a float in the tank, a snap toggle connected to the float, said snap toggle including oppositely extended levers, a second snap toggle comprising two oppositely extending levers, one of said last named levers having a forked end to loosely receive the end of one of the levers of the first toggle, the other of said levers of the second toggle being secured to the stem and adjustable stops for regulating the amount of throw of the second toggle for regulating the distance of travel of the float.

ANDREW SCHLECKER.